(12) United States Patent
Rollins

(10) Patent No.: US 8,441,924 B2
(45) Date of Patent: May 14, 2013

(54) REDUNDANT CAPABILITY IN A FIBER OPTIC NETWORK

(75) Inventor: John C. Rollins, Southlake, TX (US)

(73) Assignee: Verizon Services Organization Inc., Irving, TX (US)

( * ) Notice: Subject to any disclaimer, the term of this patent is extended or adjusted under 35 U.S.C. 154(b) by 1163 days.

(21) Appl. No.: 11/489,824

(22) Filed: Jul. 20, 2006

(65) Prior Publication Data

US 2008/0019268 A1    Jan. 24, 2008

(51) Int. Cl.
*H04L 12/26* (2006.01)

(52) U.S. Cl.
USPC .......................................... 370/229

(58) Field of Classification Search .................. 370/252, 370/217, 218, 219
See application file for complete search history.

(56) References Cited

U.S. PATENT DOCUMENTS

| | | | |
|---|---|---|---|
| 4,327,251 A * | 4/1982 | Fomenko et al. | 704/270 |
| 5,737,526 A * | 4/1998 | Periasamy et al. | 709/241 |
| 6,064,653 A * | 5/2000 | Farris | 370/237 |
| 6,601,099 B1 * | 7/2003 | Corneliussen | 709/224 |
| 6,625,141 B1 * | 9/2003 | Glitho et al. | 370/352 |
| 7,366,415 B2 * | 4/2008 | Lee et al. | 398/66 |
| 7,379,673 B2 * | 5/2008 | Krill et al. | 398/118 |
| 2002/0196793 A1 * | 12/2002 | Samba et al. | 370/401 |
| 2003/0200333 A1 * | 10/2003 | Espieu et al. | 709/240 |
| 2004/0114611 A1 * | 6/2004 | O'Connell et al. | 370/401 |
| 2005/0265346 A1 * | 12/2005 | Ho et al. | 370/392 |
| 2005/0271001 A1 * | 12/2005 | Thermond | 370/328 |
| 2006/0098632 A1 * | 5/2006 | Johnson | 370/352 |
| 2006/0140351 A1 * | 6/2006 | Croak et al. | 379/37 |
| 2006/0165064 A1 * | 7/2006 | Brown et al. | 370/352 |
| 2006/0291378 A1 * | 12/2006 | Brotherston et al. | 370/221 |
| 2007/0248077 A1 * | 10/2007 | Mahle et al. | 370/352 |
| 2007/0263532 A1 * | 11/2007 | Mirtorabi et al. | 370/228 |

* cited by examiner

*Primary Examiner* — Mark Rinehart
*Assistant Examiner* — Mohammad Anwar

(57) ABSTRACT

In one embodiment, a system includes a first gateway router and second gateway router that are communicatively coupled to an optical line terminal. The system further includes an optical network terminal communicatively coupled to the optical line terminal, wherein the optical network terminal is configured to direct communications from the first gateway router to the second gateway router when the operation of the first gateway router meets a predetermined threshold.

27 Claims, 3 Drawing Sheets

REDUNDANT CAPABILITY IN A FIBER OPTIC NETWORK

BACKGROUND

For years, reliable voice communication services have been provided over circuit-switched networks such as the public switched telephone network ("PSTN"). More recently, packet-switched networks (e.g., the Internet) capable of carrying broadband and voice communications have been developed. Such networks allow Internet Protocol ("IP") enabled devices to send and receive IP-based communications between one another over packet-switched networks such as the Internet. In order to bridge communications between the Internet and the PSTN, telecommunication providers deploy gateway routers (GWRs) at central offices where access to both the Internet and the PSTN are available through an IP core network. With such gateways in place, telecommunication companies are able to seamlessly switch between packet-switched and circuit-switched networks.

In recent years, telecommunication companies have sought to further improve communication services by launching initiatives to replace traditional "copper wire" transmission systems with fiber optics. In some instances, fiber optic services, such as "Fiber to the Premise," "Fiber to the Curb," "Fiber to the Node," and other fiber optic access network systems (referred to collectively as "FTTx" systems), are provided to end user locations and can be connected to the PSTN.

In an exemplary FTTx network, the GWR is communicatively coupled to an optical line terminal (OLT) at the central office and serves as an interface between the IP core and the FTTx network. The OLT provides a single optical fiber to an optical splitter that divides the downstream optical signal into multiple, identical signals that are broadcast to an optical network terminal (ONT), which terminates the optical circuit at a physical location associated with an end user. The ONT serves as an interface between the optical fiber and the copper-based wire inside the premise. In a full convergence FTTx network, a single fiber optic loop is capable of supporting all packet-based services, including voice and broadband access. In known configurations, a single GWR is responsible for routing both voice and broadband communications to subscribers connected to a particular OLT. Consequently, the failure of a GWR can result in thousands of subscribers being without any voice or broadband service, including the ability to seek emergency services (e.g., dial "911").

Accordingly, there is a need for a redundant design capability in an FTTx network that enables a customer to place voice calls, and in particular an emergency services call, after a GWR has failed or been compromised.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF THE INVENTION

Introduction

A preferred system and method are described herein to provide a redundant capability for seeking emergency services (e.g., making a "911" call) in a Fiber-to-the-"x" (FTTx) network. The system includes an FTTx network wherein voice and broadband signals are transmitted on an optical line from an optical line terminal (OLT) at a central office, to an optical network terminal (ONT) associated with a geographical location such as a subscriber premise. At the central office, voice and broadband signals for each end user are routed to a common OLT from individual gateway routers (GWRs). More specifically, for any given subscriber on a network, voice communications are provided through one GWR, and broadband communications are provided through a second GWR. The two GWR configuration enables select voice calls, in particular emergency services calls, to be routed through the broadband access portion of the network in the event that a GWR fails or is compromised.

In one embodiment, the preferred system includes an ONT at the subscriber premise configured to monitor the optical line to determine if a connection to a voice communication path has been compromised. In the event that voice services have been compromised and the end user has attempted to make a voice call, the ONT determines whether the voice call is one that requires emergency services. If so, the ONT is configured to look for an alternate path on the broadband access connection, and assuming the broadband access connection has not been compromised, the emergency call is re-directed to the broadband access line for transmission to the IP core. Once the call reaches the IP core, it can be routed directly to a public switched telephone network (PSTN) through a voice gateway, or the Internet. In an alternative embodiment, the ONT monitors the optical line as described above, however, if the connection to the voice path is compromised, the ONT is configured to route all voice traffic to the broadband connection for transmission to the IP core.

System Overview

Figure 1:
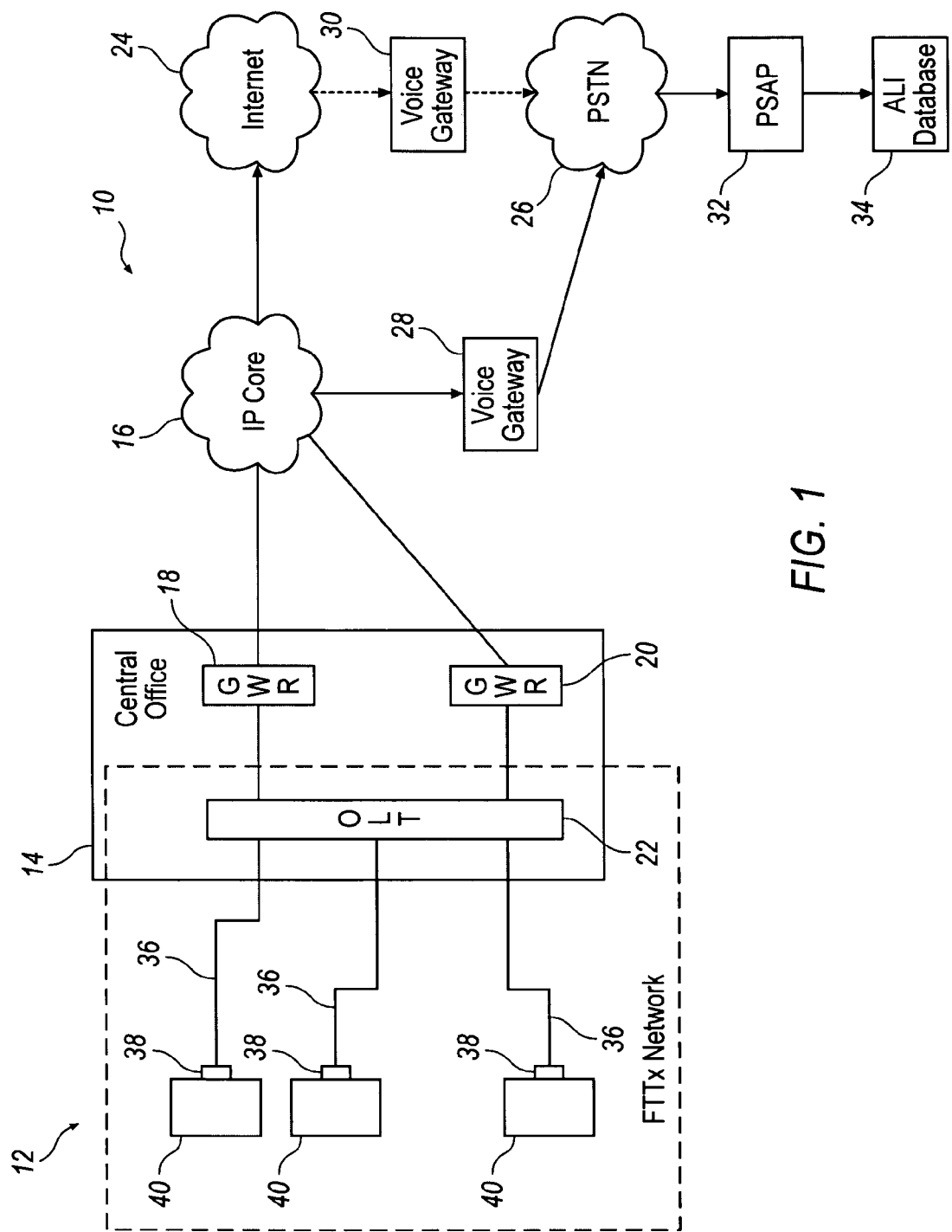
FIG. 1 illustrates an exemplary portion of a telecommunications network, according to an embodiment.

FIG. 1 illustrates an exemplary portion of a preferred telecommunications network 10 implementing a Fiber-to-the-"x" (FTTx) network 12. A central office 14 generally includes at least two gateway routers (GWRs) 18, 20 and at least one optical line terminal (OLT) 22. The GWRs 18, 20 and the OLT 22 collectively serve as an interface between the FTTx network 12 and an IP core network 16. Broadband and voice communications are routed from GWRs 18, 20, respectively, to the IP core 16 and are subsequently transmitted to either high speed data networks such as the Internet 24, or a public switched telephone network (PSTN) 26 through a voice gateway 28. Alternatively, voice communications can be transmitted through the Internet 24 to the PSTN 26 through an optional voice gateway 30. During normal operation, if a desired voice communication includes a request for emergency services, the PSTN 26 directs the call to a predetermined location such as a public safety answering point (PSAP) 32, which further accesses an automatic location identification (ALI) database 34 that identifies to the PSAP 32 the origin and physical location of the call.

As shown in FIG. 1, the FTTx network 12 originates from OLT 22 at the central office 14. From the OLT, both broadband and voice signals are broadcast on a fiber optic line 36, which terminates at an optical network terminal (ONT) 38 located outside the subscriber premise 40. In one embodiment, the ONT is physically coupled to the subscriber premise 40. In practice, the FTTx network also includes an optical splitter (not shown) between the OLT 22 and the ONT 38, which divides the downstream optical signal into multiple, identical signals that are subsequently broadcast to individual subscribers 40.

Figure 2:
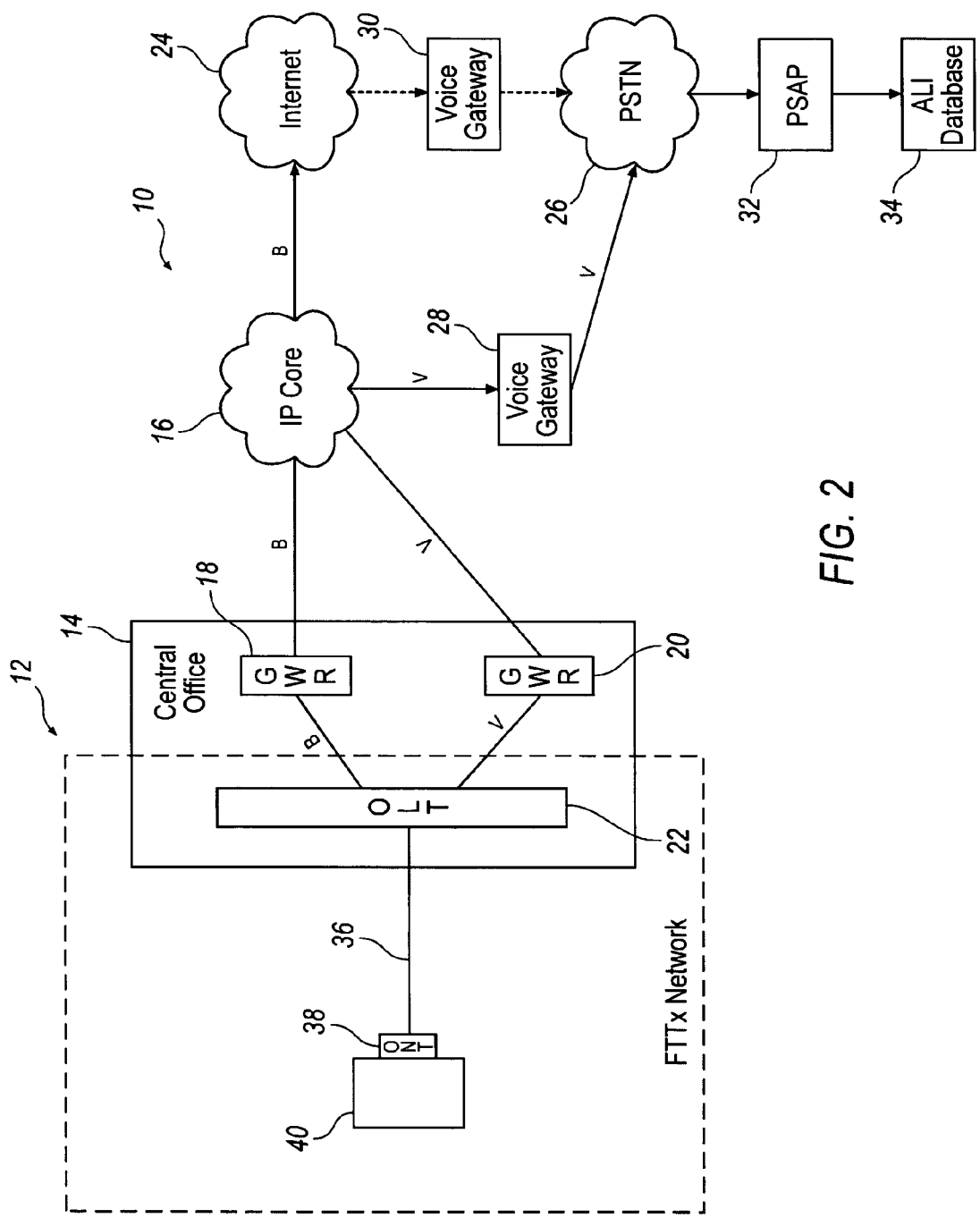
FIG. 2 illustrates an exemplary portion of the telecommunications network of FIG. 1, according to an embodiment.

FIG. 2 illustrates a portion of a communications network 10 according to FIG. 1 showing the configuration of a single connection path between the central office 14 and a subscriber premise 40. At the central office 14 voice (V) and broadband (B) communications for subscriber 40 are independently routed to a common OLT 22 through two different GWRs 18, 20. In other words, broadband (B) communications from the IP core 16 are routed to OLT 22 through GWR 18, and voice (V) communications from the IP core 16 are routed to the same OLT 22 through GWR 20. In this way, a failed or compromised GWR 20 will not affect the broadband (B) service to the subscriber 40. In fact, the ONT 38 at the subscriber premise 40 is configured to selectively re-direct voice communications from the subscriber premise 40 to the IP core through GWR 18 in the event that normal voice service through GWR 20 is compromised. In one embodiment, the ONT 38 at the subscriber premise 40 is configured to selectively re-direct voice communications through GWR 18 when GWR 20 reaches a predetermined operating threshold, such as, but not limited to, a percentage of total utilization or when latency exceeds a predefined protocol level. In another embodiment, voice communications may be re-directed upon the physical failure a GWR 20. In yet another embodiment, a GWR failure can be caused by the failure or loss of a communication line that is coupled to the GWR 20.

During normal operation, GWRs 18, 20 route both voice and broadband communications between the IP core 16 and the OLTs 22 of the FTTx network 12. As understood by one of ordinary skill in the art, each of the GWRs 18, 20 routes both voice and broadband communications, however, as illustrated by the network configuration shown in FIG. 2, voice and broadband communications for a single subscriber 40 are not routed through the same GWR 18, 20.

In an exemplary embodiment, OLT 22 receives broadband and voice communications from GWRs 18, 20, converting each into an optical signal, which OLT 22 then broadcasts across the optical line 36 to the ONT 38 at the ultimate end user. Optical signals reaching the subscriber 40 are converted to electrical signals by the ONT 38 for connection to the subscriber's internal traditional wiring. Similarly, ONT 38 performs an electrical to optical conversion on outgoing signals for transmission on the optical line 36. The OLT 22 and ONT 38 generally communicate using a Session Initiation Protocol (SIP), Voice over Internet Protocol (VoIP), or some other known protocol. SIP is fully discussed in J. Rosenberg et al., RFC 3261, "SIP: Session Initiation Protocol," June 2002, published by the Internet Society of Reston, Va., presently available on the World Wide Web (e.g., via the faqs.org web site), and fully incorporated herein by reference in its entirety.

Exemplary Processes

Figure 3:
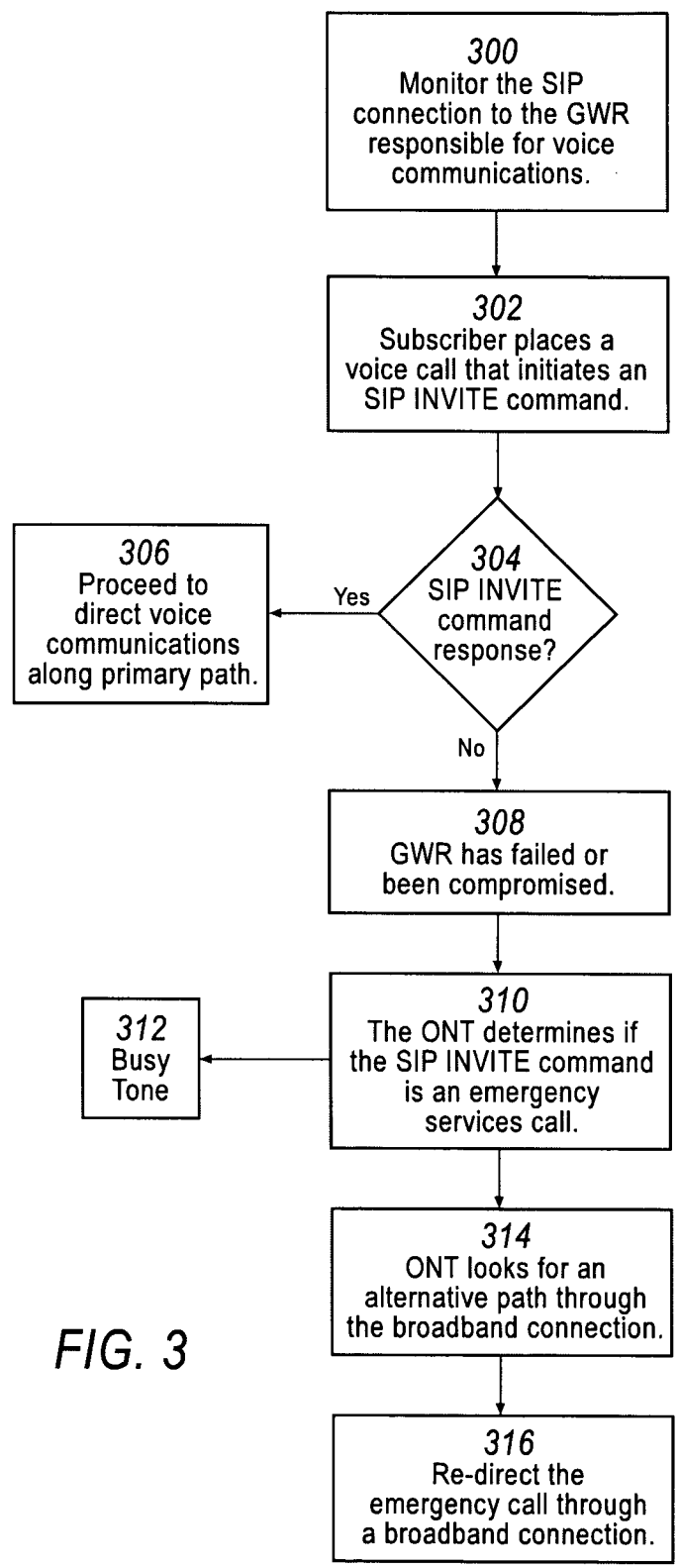
FIG. 3 is a flow chart illustrating an exemplary method for a providing redundant capability in a fiber optic network, according to an embodiment.

FIG. 3 illustrates an exemplary process for routing voice communications upon the failure of a GWR. References to physical components refer to the exemplary components illustrated in FIGS. 1 and 2. The following processes exploit the functionality of a SIP capable ONT to implement the redundancy function of the network shown in FIGS. 1 and 2. However, one of ordinary skill in the art understands that these processes can be implemented by any optical terminating device in the network such as, for example, the OLT or at any other point in the network where the optical line terminates. In addition, one of ordinary skill in the art understands that the exploitation of the SIP functionality in the ONT is exemplary, and that any other IP-based communications protocol may be implemented, such as, but not limited to, H.323 and Media Gateway Control Protocol (MGCP).

FIG. 3 is a flow diagram illustrating a set of exemplary steps for providing redundancy in a fiber optic network. At step 300, ONT 38 monitors the SIP connection on the optical line to GWR 20, which routes the voice communications for a given subscriber 40. In an exemplary embodiment, ONT 38 contains dial plan information for each subscriber 40. The dial plan information generally includes, for example, information related to the customers' particular calling plan options including toll free number availability and local emergency services information.

At step 302, the subscriber 40 places a voice call to an unidentified user (not shown in the Figures), which initiates a SIP INVITE command. At step 304, ONT 38 determines whether there has been a response from the SIP INVITE command. If a response has been received, ONT 38 proceeds at step 306 to direct the voice call along the primary designated voice communications path. If there has been no response to the SIP INVITE, ONT 38 recognizes at step 308 that GWR 20 has failed or otherwise been compromised. The failure of a GWR can be generally defined by a SIP INVITE that receives no response back from the network. The failure to receive a response can be caused by any number of network conditions, including, but not limited to, a total hardware failure of the GWR 20 itself, the loss of a communications line coupled to the GWR, by exceeding a percentage of total utilization, or when latency exceeds a predefined protocol level.

Recognizing at step 308 that the voice path to GWR 20 has failed or been comprised, ONT 38 determines at step 310 if the SIP INVITE initiated by the subscriber 40 is an emergency services call, such as a call to dial 911. This is accomplished by analyzing the dial digits of the placed call in comparison to the subscriber's dial plan information. If the call attempt is not an emergency services call, the subscriber receives a busy tone at step 312. If the call attempt is an emergency services call, ONT 38 looks for an alternative path at step 314 through the broadband access connection. If broadband access is available, ONT 38 at step 316 re-directs the emergency call through a broadband connection such as, but not limited to, Voice over Internet Protocol (VoIP). Once the emergency call reaches GWR 18, the call can be routed as usual through the IP Core 16 to the voice gateway 28 or as an alternate configuration, though the internet using voice gateway 30. From voice gateway 28 or 30, the call is directed to the PSTN 26 and PSAP 32.

In an alternative embodiment, recognizing at step 308 that the voice path to GWR 20 has failed or been comprised, ONT 38 re-directs all voice traffic through the broadband connection as described above without first determining if the voice call is an emergency services call. In other words, in the alternative embodiment, ONT 38 is configured to route all voice traffic to the broadband connection for transmission to the IP core 16 without regard for the type of communication. In yet another embodiment, ONT 38 can be configured to re-direct voice traffic based upon a call priority that is determined by analyzing the dialing digits and determining a call type (e.g., an emergency services call).

The exemplary steps provided in FIG. 3 are applicable to each voice call that is attempted from the subscriber 40 premise. In this way, the ONT 38 monitors the voice communications path on a call-by-call basis, wherein the ONT 38 attempts to transmit each voice call on the primary voice path first regardless as to whether the previous call was re-directed.

It should be understood by those skilled in the art that various alternatives to the embodiments of the invention described herein may be employed without departing from the spirit and scope of the invention as defined in the following claims. It is intended that the following claims define the scope of the invention and that any method and system within the scope of these claims and their equivalents be covered thereby. This description of the preferred embodiments should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A system comprising:
a plurality of gateway routers including at least a first gateway router and a second gateway router, each of said plurality of gateway routers configured to route both voice and broadband communications, wherein said first gateway router is assigned to route voice communications for a subscriber, said second gateway router is assigned to route broadband communications for the subscriber and is further assigned to route voice communications for a second subscriber, and one of said plurality of gateway routers other than said second gateway router is assigned to route broadband communications for the second subscriber;
an optical line terminal communicatively coupled to said first gateway router and said second gateway router; and
an optical network terminal communicatively coupled to said optical line terminal;
wherein said optical network terminal is configured to determine a call priority based on a communication associated with the subscriber, and to selectively direct communications from said first gateway router to said second gateway router based on said call priority when operation of said first gateway router meets a predetermined threshold.

2. The system of claim 1, wherein said predetermined threshold is met upon a total failure of said first gateway router.

3. The system of claim 2, wherein said total failure is one of the physical router or a communication line coupled to said router.

4. The system of claim 1, wherein said predetermined threshold is met when said first gateway router reaches a predetermined percentage of total utilization, and at least a portion of said communications are directed from said first gateway router to said second gateway router.

5. The system of claim 1, wherein said predetermined threshold is met when latency in said first gateway router exceeds a predetermined protocol level, and at least a portion of said communications are directed from said first gateway router to said second gateway router.

6. The system of claim 1, wherein said optical network terminal is physically coupled to a subscriber premise.

7. The system of claim 1, wherein said first gateway router is configured to send and receive voice communications between an internet protocol core and a subscriber premise, and said second gateway router is configured to send and receive broadband communications between said internet protocol core and said subscriber premise.

8. The system of claim 7, wherein said voice communications include dial digits that define a voice communication type.

9. The system of claim 8, wherein said optical network terminal determines said call priority based on said voice communication type.

10. The system of claim 1, wherein said first gateway router is configured to provide a voice communications path between an internet protocol core and a subscriber premise, and said second gateway router is configured to provide a broadband access path between said internet protocol core and said subscriber premise.

11. The system of claim 1, wherein said one of said plurality of gateway routers other than said second gateway routers is said first gateway router.

12. A system comprising:
a plurality of gateway routers including a first gateway router and a second gateway router, each of said plurality of gateway routers configured to route both voice and broadband communications, wherein said first gateway router is assigned to route voice communications for a subscriber, said second gateway router is assigned to route broadband communications for the subscriber and is further assigned to route voice communications for a second subscriber, and one of said plurality of gateway routers other than said second gateway router is assigned to route broadband communications for the second subscriber; and
at least one optical terminating device communicatively coupled to said first gateway router and said second gateway router;
wherein said optical terminating device is configured to selectively direct voice communications associated with the subscriber from said first gateway router to said second gateway router when operation of said first gateway router meets a predetermined threshold.

13. The system of claim 12, wherein said at least one optical terminating device is physically coupled to a subscriber premise.

14. A system comprising:
a plurality of gateway routers including at least a first gateway router and a second gateway router, each of said plurality of gateway router configured to route both voice and broadband communications, wherein said first gateway router is assigned to route voice communications for a subscriber, said second gateway router is assigned to route broadband communications for the subscriber and is further assigned to route voice communications for a second subscriber, and one of said plurality of gateway routers other than said second gateway router is assigned to route broadband communications for the second subscriber;
an optical line terminal communicatively coupled to said first gateway router and said second gateway router; and
an optical network terminal communicatively coupled to said optical line terminal;
wherein said optical network terminal is configured to direct voice communications associated with the subscriber from said first gateway router to said second gateway router when operation of said first gateway router meets a predetermined threshold and said voice communication is an emergency services call.

15. The system of claim 14, wherein said optical network terminal determines that said voice communication is an emergency services call by analyzing dial digits of said voice communication.

16. A method comprising:
- assigning a first gateway router to route voice communications for a subscriber and a second gateway router to route broadband communications for the subscriber, each said gateway router being configured to route both voice and broadband communications as one of a plurality of gateway routers;
- assigning said second gateway router to route voice communications for a second subscriber and one of said plurality of gateway routers other than said second gateway router to route broadband communications for the second subscriber;
- monitoring a voice communications path to said first gateway router on said voice communications path;
- determining a failure of said first gateway router when meeting a predetermined threshold;
- determining a call priority of a voice communication associated with the subscriber; and
- directing at least a portion of said voice communication to said second gateway router based on said call priority when said first gateway router meets said predetermined threshold.

17. The method of claim 16, wherein meeting said predetermined threshold includes when latency in said first gateway router exceeds a predetermined protocol level.

18. The method of claim 16, further comprising the step of analyzing dial digits of a voice communication to determine a voice communication type.

19. The method of claim 18, wherein said step of determining said call priority comprises determining said call priority based on said voice communication type.

20. The method of claim 16, further comprising directing said voice communication to said second gateway router if said voice communication is an emergency services call.

21. The method of claim 16, wherein the step of monitoring includes monitoring session initiation protocol communications.

22. The method of claim 21, further comprising the step of sending a session initiation protocol invite command, and directing at least a portion of said voice communications to said second gateway router if said first gateway router fails to respond to said session initiation protocol invite command.

23. The method of claim 16, wherein the step of directing said voice communications to said second gateway router is accomplished using Voice over Internet Protocol (VoIP).

24. The method of claim 16, wherein meeting said predetermined threshold includes said first gateway router reaching a total failure.

25. The method of claim 16, wherein meeting said predetermined threshold includes said first gateway router reaching a predetermined percentage of total utilization.

26. The method of claim 16, wherein said first gateway router is configured to send and receive voice communications between an internet protocol core and a subscriber premise, and said second gateway router is configured to send and receive broadband communications between said internet protocol core and said subscriber premise.

27. The method of claim 16, further comprising assigning two of said plurality of gateway routers to a third subscriber, wherein one of the two of said plurality of gateway routers is assigned to route voice communications for the third subscriber, and another of the two of said plurality of gateway routers is assigned to route broadband communications for the third subscriber.

* * * * *